June 20, 1933.  J. A. SCHEIBLI ET AL  1,915,204
RECORDING DEVICE FOR GRADING THREAD AND THE LIKE
Filed Oct. 26, 1931   2 Sheets-Sheet 1
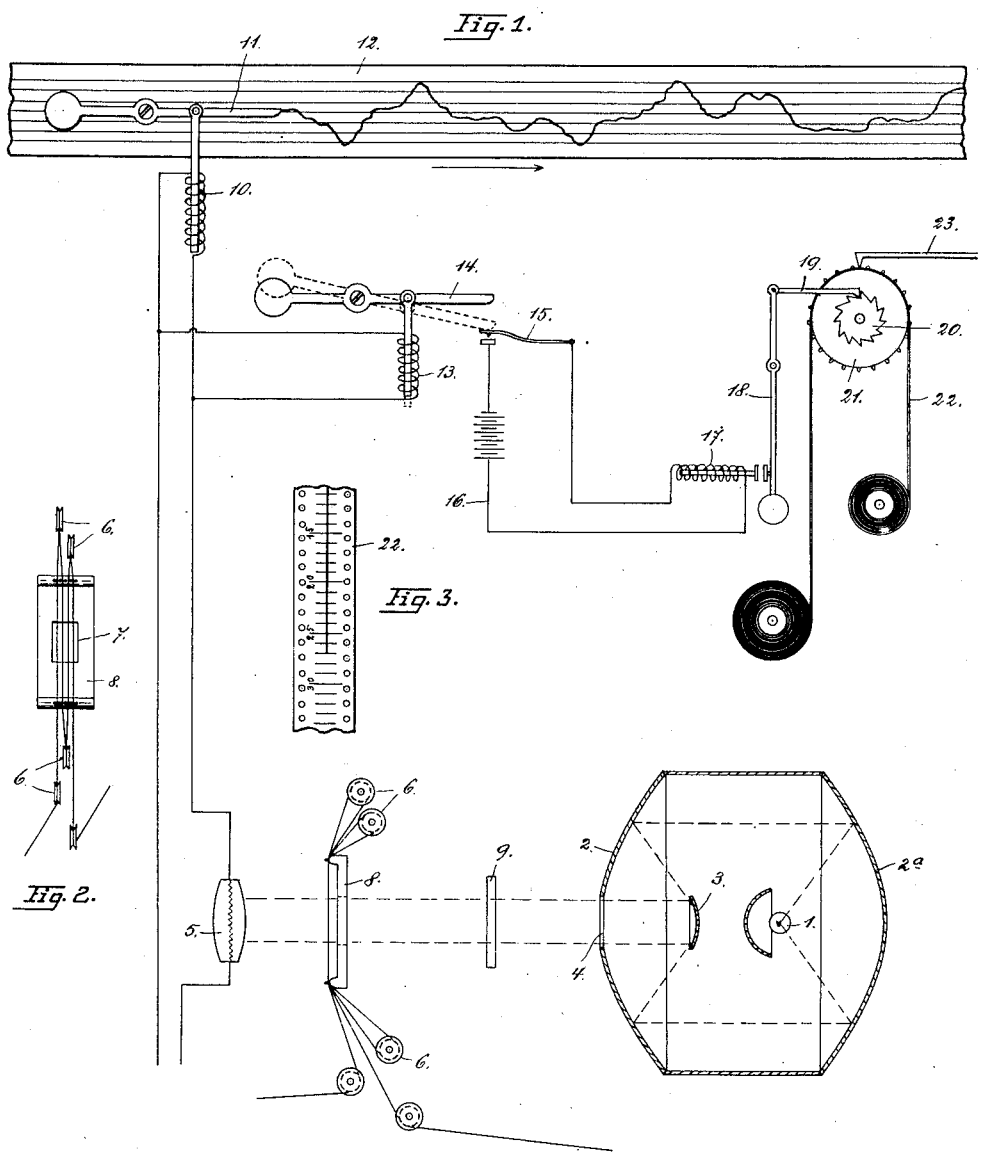

Patented June 20, 1933

1,915,204

UNITED STATES PATENT OFFICE

JOHN A. SCHEIBLI AND CHARLES H. CANSDALE, OF MEXICO CITY, MEXICO

RECORDING DEVICE FOR GRADING THREAD AND THE LIKE

Application filed October 26, 1931. Serial No. 571,196.

The invention relates to an apparatus for the photometric measurement and graphic recording of the unevenness of raw silks for their classification and valuation. Owing to the absence of such an evenness measuring instrument the silks unevenness had, up to the present time, of necessity to be judged merely by sight, and therefore this photometric thread grading apparatus fills a long felt want, particularly so as the values of raw silk are being gauged principally by their grade of evenness which varies from 50% variation of their own average size in the most evenly reeled raw silks to 100% and more variation of their average size in the poorer grades, which unevenness is accounted for by the fact that the fibres composing the reeled raw silk thread are themselves of a variety of sizes, since they run off the cocoons unevenly by increasing in size from the beginning to the middle of the cocoon and decreasing in thickness from the middle toward the end of the cocoon.

The invention has not only for its object to provide an instrument for graphically recording on a chart the varying thicknesses of the raw silk, but also to provide means whereby the total number of the thinnest portions of a given length of raw silk is automatically recorded, so that the grade of samples and thereby the value of the lot of raw silk become immediately apparent by proportionally comparing the total record of the thinnest parts of the samples with that of the entire lot.

Two preferred embodiments of the invention are shown in the accompanying drawings, in which:

Figure 1 represents diagrammatically a thread grading apparatus in which the recording means are actuated by solenoids, in a circuit with a selenium cell.

Figure 2 is a front view of the thread guide.

Figure 3 represents a portion of the perforated chart on which the number of thinnest parts of the silk is recorded.

Figure 5:
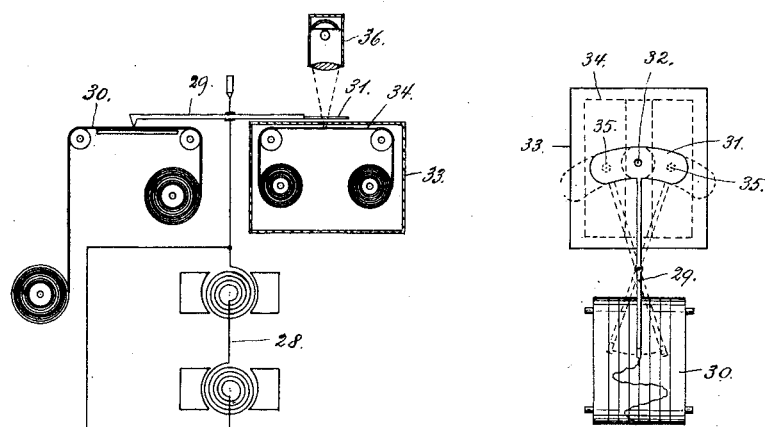
Figure 5 is a top view of the graphic recording instruments.

The principle underlying the invention is based upon the varying transparency, owing to varying thicknesses, of a silk thread passing several times close together and parallelly before an opening lighted by a narrow straight beam of light, which after having passed through said threads, strikes a light-sensitive element, so connected electrically with the recording instruments that the greater or less amount of current due to the varying intensity of the light falling on the sensitive element, actuates said recording instruments and produces an accurate graphic record of all the variations in the size of the silk under test.

In the thread grading apparatus shown in Figure 1, a source of light 1, reflected by opposite parabolic mirrors 2 and 2ᵃ into a small parabolic focusing mirror 3, is thrown from this mirror through an aperture 4 in mirror 2, in the form of a narrow straight beam of light on a selenium cell 5. The silk thread to be tested is guided by suitably placed rollers 6 so as to pass in a number of parallel turns, closely and equally spaced, in front of an opening or window 7 provided in a frame 8, which is placed transversally to the path of the light ray, so that the light must pass through said opening before striking the selenium cell. A suitable screen 9 for filtering out the heat rays or for detaining all but monochromatic light, may also be interposed in the light ray.

According to the thickness of the thread passing before the window 7, the intensity of the light falling on the selenium cell varies, decreasing or increasing the normal current passing through said selenium cell. This current energizes a solenoid 10, the core of which is attached to a pen 11 writing on a ruled chart 12 driven at a determined speed. Every increase or drop in the current passing through the selenium cell and due to the varying intensity of the light falling on it, will therefore be graphically recorded on the chart, and the line thus obtained will represent an accurate graphic record of all the variations in the thicknesses of the silk sample passing before the window 7.

For recording the number of thinnest portions of the silk sample under test, a second solenoid 13 is connected, preferably in parallel, with the first solenoid 10, with its core pivoted to a lever 14, preferably corresponding in size with the pen element 11, and subjected therefore to oscillations identical in extension with those of said pen 11. As the deviation both of the pen 11 and of the lever 14 reaches a point corresponding to a certain degree of thinness of the thread, the tip of the lever 14 depresses a flat spring 15, closing thereby an independent electrical circuit 16. The current of this circuit energizes the core of a magnet 17, which attracts a pivoted pendulum 18, the upper end of which actuates by means of a ratchet 19 a wheel 20 attached to a drum 21, around which passes a perforated chart 22. A stationary pen 23 bears on said chart on the top of the drum 21.

Every time a portion of a determined thinness in the thread under test passes before the window 7, the resulting increase in the current energizing the solenoid 13 will close the circuit 16, and the ratchet wheel 20 will be advanced for the distance of one of its teeth, while the pen 23 will mark a corresponding distance on the chart 22. This chart being ruled with numbered transverse lines spaced in relation with the distance travelled by the pen 23 on each part revolution of the drum 21, a continuous line will be scribed on the chart, covering as many ruled spaces as there have been passing thin portions of the thread, and providing thereby a means by which the unevenness of the silk of tested yardages is instantly known.

Figure 4:
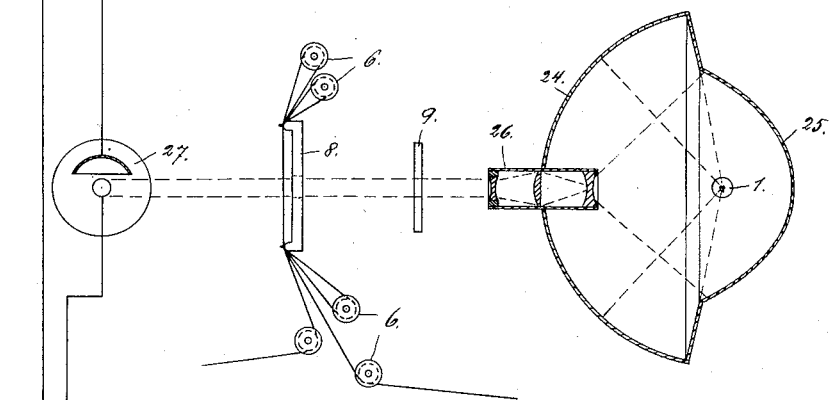
Figure 4 is another diagrammatic view of a thread grading apparatus in which the recording means are actuated by a torsion galvanometer in combination with a photo-electric cell.

In Figure 4 is shown a photometric thread grading device comprising a source of light 1, reflected from both a spherical and an elliptical mirror (24 and 25) into a system of lenses 26, from which the light emerges in form of a narrow straight beam directed onto a photo-electric cell 27, the thread guide 8 and the filter screen 9 being interposed in the path of this beam as described in relation with Figure 1.

The current passing through the photoelectric cell 27 energizes a torsion galvanometer 28 suitably suspended, and having attached to it a pen 29 bearing on a ruled chart 30, said pen being laterally displaced according to the degree of torsional rotation of the galvanometer. The end of the pen opposite to the pen point carries a thin plate 31 having a hole 32 in its center. Said plate 31, following the displacements of the recording pen 29, moves horizontally above a light-tight box 33 housing one or two rolls of light-sensitive paper 34, which is suitably driven to move horizontally below the top of said box 33, parallel with and in spaced lateral relation to the pen 29 in its normal zero position. The top of the box 33 is further provided with two holes 35, located one above the center of the upper extended part of each roll of paper 34, or at both sides of a single roll of paper 34, and so disposed as to coincide with the hole 32 in plate 31 in either of its extreme positions, corresponding with the recordings of the thickest and of the thinnest portions of the thread on chart 30, positions indicated by dotted lines in Figure 5. Two lamps 36, located one above each hole 35, throw a point of light into either of said holes as soon as one is uncovered by the hole 32 of the shutter-like plate 31, said lights impressing the sensitive paper in the box 33. The number of marks on one roll, or on one side of a single roll, indicates the number of thin portions of the tested silk, while the number of marks on the other roll, or on the other side of a single roll, indicates the thick portions.

We claim:

1. A device for grading thread, comprising an electrical circuit including a light-sensitive element having a beam of light striking said element, closely spaced parts of a thread interposed in the path of said light, and means operated by the varyingly intensified current flowing in the circuit to make a record of the character of the thread.

2. A device for grading thread, comprising an electrical circuit including a light-sensitive element having a beam of light directed against said element, a moving thread guided repeatedly across said beam of light, and electro-magnetic means energized by the varyingly intensified current flowing in the circuit for continuously recording the character of the thread.

3. A device for grading thread, comprising a light-sensitive element having a beam of light directed against said element, a moving thread guided repeatedly across said beam of light, and electro-magnetic means energized by the varyingly intensified current flowing in the circuit for making a record at the maximal and minimal intensities of said current.

4. A device for grading thread comprising an electrical circuit including a light-sensitive element having a beam of light striking said element, a plurality of closely spaced parts of a travelling thread crossing the path of said beam of light, and means placed in the circuit and operated by the varyingly intensified current flowing therethrough to produce a continuous record on a record element of the size of the moving thread under test.

5. A device for grading thread comprising an electrical circuit including a light-sensitive element having a beam of light striking said element, a plurality of closely spaced parts of a travelling thread crossing the path of said beam of light, and means placed in the circuit and operated by the varyingly intensified current passing through said element and circuit to produce a record on a record element on exclusively the thin and thick parts of the moving thread under test.

6. A device for grading thread, comprising an electrical circuit including a light-sensitive element a parallel beam of light falling on said element, a plurality of closely spaced and parallelly guided turns of a moving thread interposed in the path of said beam of light, and electro-magnetic means operated by the varyingly intensified current passing through said circuit to continuously operate a graphic recording instrument recording the size of the moving thread under test.

7. A device for grading thread, comprising a light-sensitive element having a parallel beam of light falling on said element, a plurality of closely spaced and parallelly guided turns of a moving thread interposed in said beam of light, and electro-magnetic means operated by the varyingly intensified current passing through said circuit to operate a graphic recording instrument recording exclusively the thin and thick parts of the moving thread under test.

8. A recording device for grading thread comprising an electrical circuit including a light sensitive element having a beam of light directed thereagainst, a portion of a travelling thread interposed in the path of the beam, and means for indicating the character of the thread operated by the varying current flowing in the circuit caused by the passage of the thread through the light beam.

9. In a device having means to record the varying thickness of a thread; an electrical circuit including a light sensitive element having a beam of light directed thereagainst, a portion of a travelling thread interposed in the path of the beam, and means for recording the maximum and minimum thickness of the thread operated by the varyingly intensified current flowing in the circuit caused by the passage of the thread through the light beam.

10. In a device having means for making a continuous record of a travelling thread; an electrical circuit including a light sensitive element having a beam of light directed thereagainst, a plurality of closely spaced parts of a travelling thread interposed in the path of the beam, and means for recording the maximum and minimum thickness of the thread operated by the varyingly intensified current flowing in the circuit caused by the passage of the thread through the light beam.

11. In a device having means to record the varying thickness of a thread on a moving tape; an electrical circuit including a light sensitive element having a beam of light directed thereagainst, means for guiding a plurality of closely spaced parts of a travelling thread through the path of the beam, means for eliminating undesirable rays from the beam, and means for recording the maximum and minimum thickness of the thread, said last means including an electro-magnet operated by the varyingly intensified current flowing in the circuit caused by the passage of thread through the light beam.

In testimony whereof we affix our signatures.

JOHN A. SCHEIBLI.
CHARLES H. CANSDALE.